United States Patent [19]

Busch

[11] Patent Number: 4,704,673
[45] Date of Patent: Nov. 3, 1987

[54] PHASE-ADJUSTING DEVICE FOR PARALLEL-RESONANT CIRCUIT FREQUENCY CONVERTERS

[75] Inventor: Bernd Busch, Remscheid, Fed. Rep. of Germany

[73] Assignee: AEG-Elotherm GmbH, Remscheid Hasten, Fed. Rep. of Germany

[21] Appl. No.: 1,850

[22] Filed: Jan. 9, 1987

[30] Foreign Application Priority Data

Jan. 17, 1986 [DE] Fed. Rep. of Germany ....... 3601191

[51] Int. Cl.$^4$ ............................................. H02P 13/18
[52] U.S. Cl. ..................................... 363/98; 363/132; 363/136
[58] Field of Search .................. 323/212, 217; 363/97, 363/98, 132, 136

[56] References Cited

U.S. PATENT DOCUMENTS

| 4,336,585 | 6/1982 | Moriarty et al. | 363/136 X |
| 4,424,557 | 1/1984 | Steigerwald | 363/98 |
| 4,523,267 | 6/1985 | Mehl | 363/132 X |
| 4,651,271 | 3/1987 | Grace | 363/98 |

FOREIGN PATENT DOCUMENTS 3441001 5/1986 Fed. Rep. of Germany .

Primary Examiner—Peter S. Wong
Attorney, Agent, or Firm—Kerkam, Stowell, Kondracki, & Clarke

[57] ABSTRACT

The invention relates to a phase-adjusting device for the inverter, having controllable semiconductors, of a parallel-resonant circuit frequency converter. The phase-adjusting device, operating on the PLL principle, compares a signal derived from the inverter output voltage and a signal delayed by a predetermined amount in relation to the control pulses of the oscillator 1 to a phase-comparing stage. In dependence on the phase comparison of the two signals, the oscillator frequency is so adjusted that the inverter output voltage and the inverter output current are in phase.

1 Claim, 1 Drawing Figure

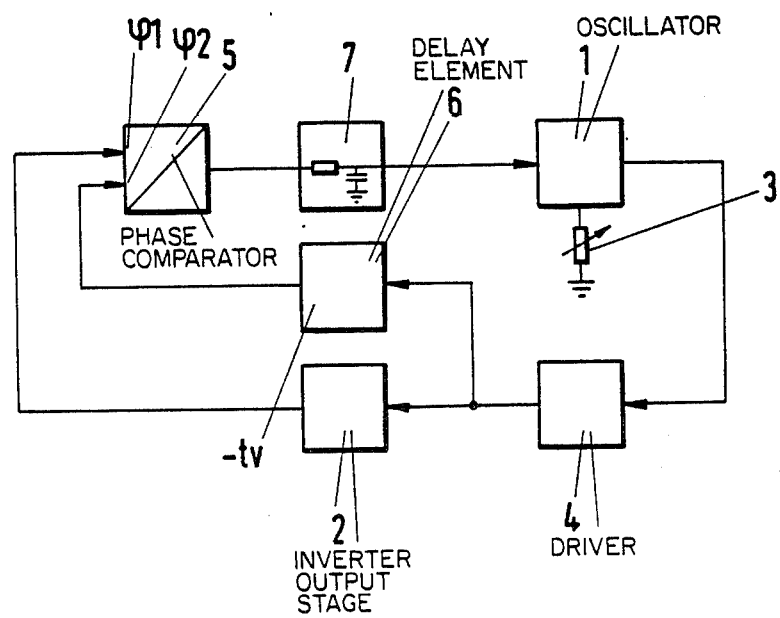

PHASE-ADJUSTING DEVICE FOR PARALLEL-RESONANT CIRCUIT FREQUENCY CONVERTERS

BACKGROUND OF THE INVENTION

The invention relates to a phase-adjusting device for the inverter, having controllable semiconductors, of a parallel-resonant circuit frequency converter having an oscillator which supplies control pulses to the semiconductors and is operated by a phase-comparing stage, such phase-comparing stage so controlling the oscillator frequency in dependence in the phase shift of a signal in phase with the inverter output voltage and a signal in phase with the inverter output current that the inverter output voltage and the inverter output current are in phase.

If merely the inverter output voltage were to be used to operate the semiconductors of the inverter, in order to maintain the oscillation of a loaded parallel-resonant circuit of a frequency converter, the result would be an inductive phase shift between the inverter output voltage and the inverter output current. The inductive reverse currents would endanger the semiconductors to be controlled.

The use of a known phase-adjusting device of the kind specified obviates this risk. A direct phase comparison of the inverter output voltage and the inverter output current enables a control signal for the oscillator to be obtained by means of which the phase shift can be controlled by raising or lowering the oscillator frequency. However, problems arise with that phase-adjusting device if a hardly detectable inverter output current, if any, is flowing. Such conditions occur, for example, during build-up.

SUMMARY OF THE INVENTION

It is an object of the invention to provide a phase-adjusting device for inverters of a parallel-resonant circuit frequency converter, wherein the inverter output current and the inverter output voltage are kept in phase, more particularly during idling, independently of the resonant circuit loading.

To this end in a phase-adjusting device of the kind specified a delay element operated by the control pulses of the oscillator supplies to the phase-comparing stage signals delayed in relation to such control pulses as the signals in phase with the inverter output current.

The phase-adjusting device according to the invention is based on the PLL (phase locked loop) principle and on the knowledge that the phase shift occurring during operation between the inverter output voltage and the inverter output current is dependent on the circuit—i.e., depends on the running and connection times of the component parts. A fixed phase shift corresponding to the running and connection times of the circuit component elements can therefore be assumed and the inverter output voltage taken as a guide value. The inverter output current is therefore not required for phase synchronization. The inverter output voltage and inverter output current can therefore still be kept in phase even when the inverter is idling and no signal usable for phase comparison can be derived from the inverter current.

BRIEF DESCRIPTION OF THE DRAWINGS

The invention will now be explained with reference to a block circuit diagram.

DESCRIPTION OF THE PREFERRED EMBODIMENTS

An oscillator 1, whose frequency for the build-up of a parallel-resonant circuit of an inverter output stage 2 can be adjusted via an adjusting member 3, operates a driver 4 which in accordance with the frequency of the oscillator 1 delivers control pulses to the control inputs of the controllable semi-conductors, for example, the MOSFETs of the inverter output stage 2 constructed as a bridge circuit. The voltage signal occurring on the resonant circuit of the inverter output stage 2 is delivered to an input of a phase-comparing stage 5 whose other input receives a signal delayed in relation to the control pulses of the driver 4 from a delay element 6 which, like the inverter output stage 2, is operated by the driver 4. Of course, the signal transmitter 6 might also be controlled directly by the oscillator 1. In any case, the delay element 6 delivers a signal delayed by a predetermined amount $t_v$ in relation to the control signals for the inverter output stage 2. The phase-comparing stage 5 determines the phase shift between these two signals. If a phase shift is detected, the phase-comparing stage 5 delivers via a low-pass filter 7 to the oscillator 1 an adjusting signal which so raises or lowers the frequency that current and voltage in the resonant circuit are again in phase. The low-pass filter 7 damps the adjusting behaviour of the phase-adjusting device.

The phase-adjusting device according to the invention ensures that the parallel-resonant circuit subjects the inverter solely to a resistive load, independently of the loading of the circuit, so that there can be no question of the semiconductor component elements being endangered.

I claim:

1. A parallel-resonant circuit frequency converter comprising:
    an inverter output stage including a resonant circuit and controllable semiconductors connected to said resonant circuit, the inverter output stage during operation providing an output voltage and an output current;
    an oscillator subject to phase locked loop frequency control connected for supplying control signals to drive said controllable semiconductors;
    a phase comparator having two inputs and an output connected to control the frequency of said oscillator in a manner such that the output voltage and the output current are in phase;
    one input of said phase comparator being connected to receive a voltage signal from said inverter output stage; and
    a delay element having an input connected to receive control signals from said oscillator and an output connected to the other input of said phase comparator, the delay element introducing a fixed phase shift assumed to equal the phase delay between the control signals and the actual output current;
    whereby actual output current is not required for phase synchronization.

* * * * *